July 4, 1967  A. STADERINI  3,328,884
PROCEDURE AND DEVICE FOR THE DIRECT TRANSPOSITION
OF RAISED CONFIGURATIONS AND CREATION OF
COMPOSITE PATTERNS UPON PLANE SURFACES
Filed May 27, 1965  2 Sheets-Sheet 1
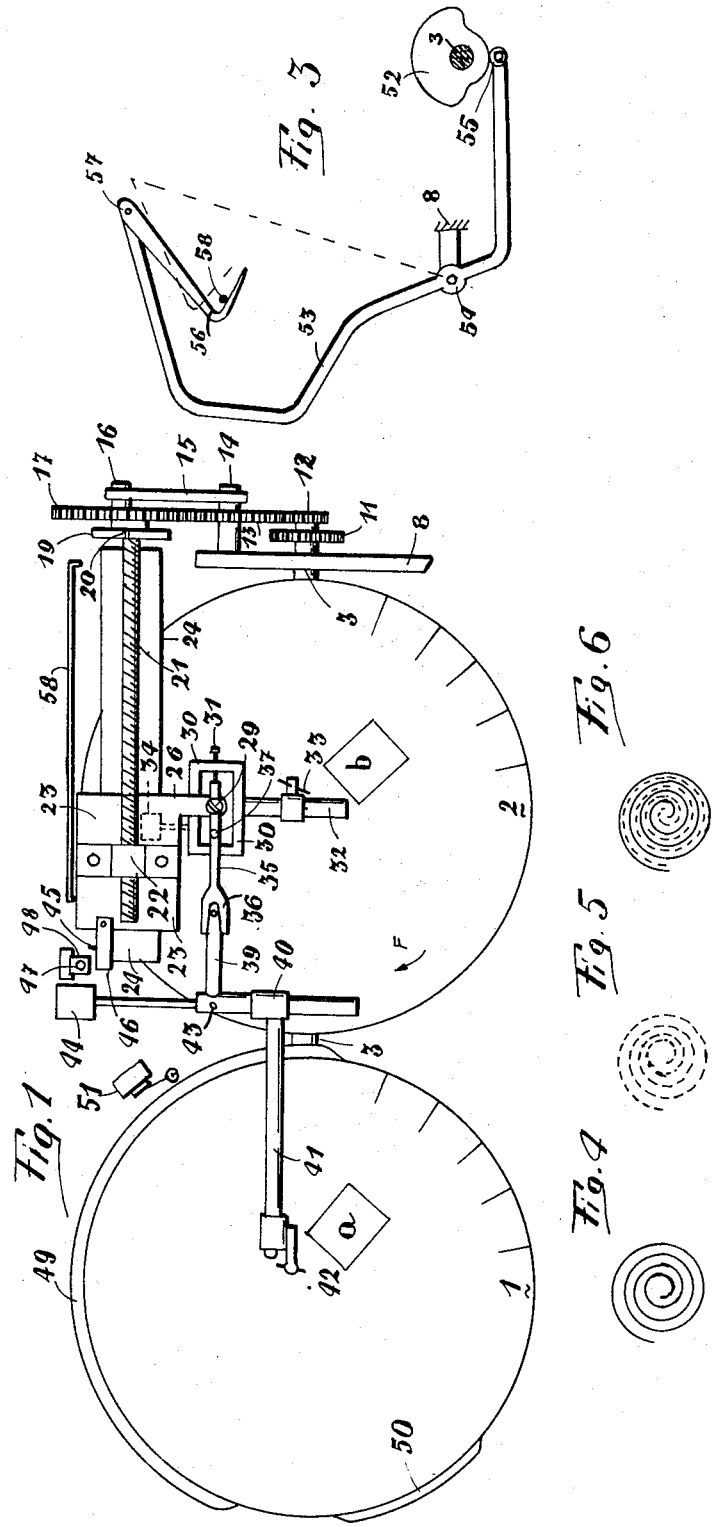

July 4, 1967  A. STADERINI  3,328,884
PROCEDURE AND DEVICE FOR THE DIRECT TRANSPOSITION
OF RAISED CONFIGURATIONS AND CREATION OF
COMPOSITE PATTERNS UPON PLANE SURFACES
Filed May 27, 1965  2 Sheets-Sheet 2
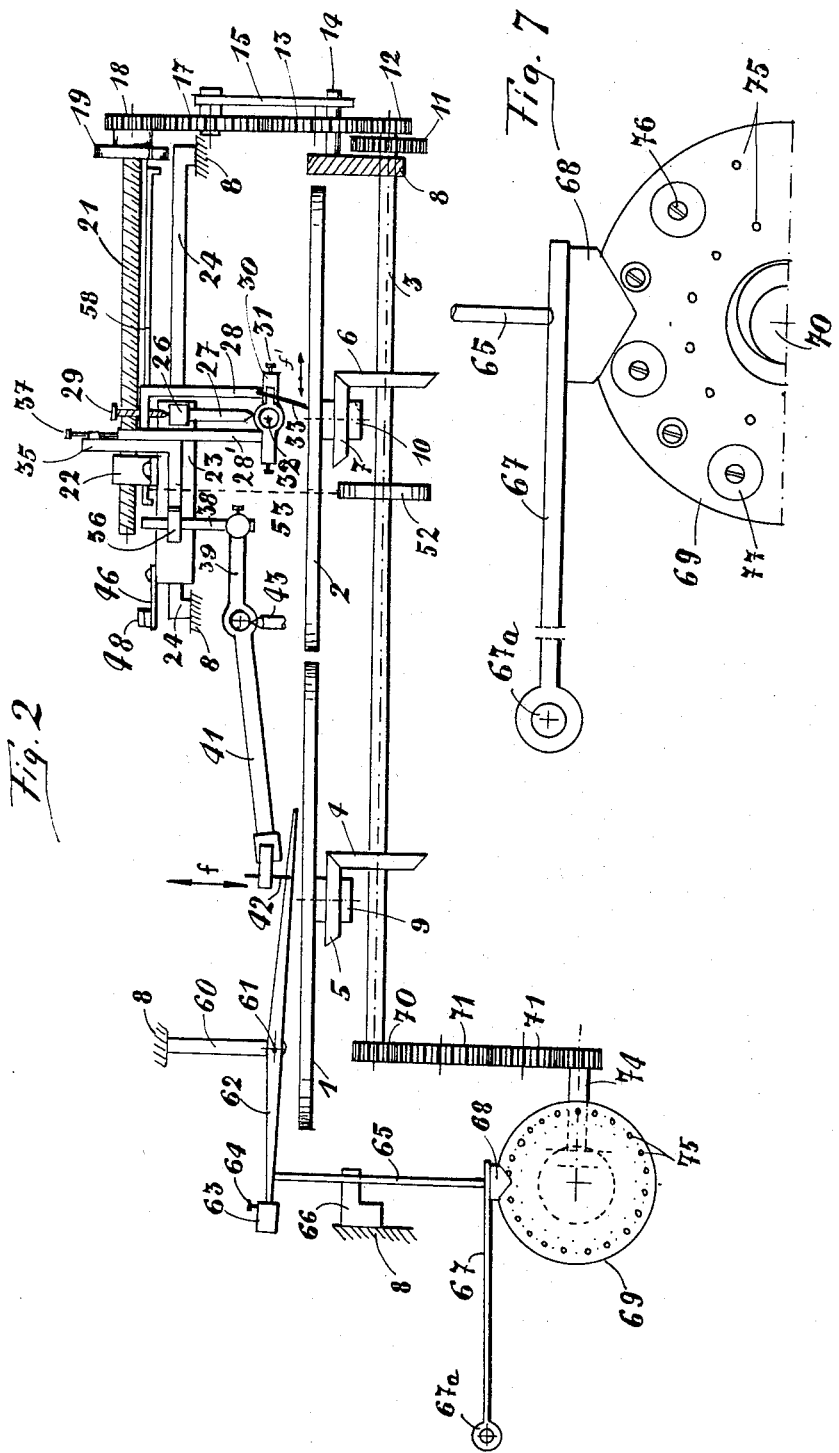

United States Patent Office 3,328,884
Patented July 4, 1967

3,328,884
PROCEDURE AND DEVICE FOR THE DIRECT TRANSPOSITION OF RAISED CONFIGURATIONS AND CREATION OF COMPOSITE PATTERNS UPON PLANE SURFACES
Aldo Staderini, 45 Via Baccina, Rome, Italy
Filed May 27, 1965, Ser. No. 459,274
13 Claims. (Cl. 33—23)

The present invention refers to a procedure and apparatus for tracing composite patterns and for transposing raised configurations, such as coins, medals etc. with surprising relief effect upon plane surfaces, by means of spiraliform or circular lines.

Of the various known techniques hitherto used for the transposition of reliefs upon plane surfaces, i.e. for the so-called numismatic engraving, the most widely used are based on rectilinear transpositions, in which the lines drawn by the tracer point of the pantograph to reproduce the relief are basically straight and parallel. Since no machine is needed to trace straight parallel lines, the resulting figures can be quite easily imitated by skilled counterfeiters.

Procedure and apparatus for the reproduction of reliefs by curvilinear transposition are also known. In these, however the relief is not directly transposed upon a plane, but first transferred to a cylindrical mantle and only thence upon a plane surface. The disadvantage of this procedure is a distorted reproduction of the original, the amount of distortion increasing from the center towards the periphery.

The improvement over the prior art provided by the present invention consists in a much superior relief effect and lack of distortion in the plane image obtained and, this in addition to the fact that it offers a choice of a plurality of practically infinitely variable parameters of reproduction determining both the course of the curved lines and the transposition of the relief into a plane image, which defy duplication by anyone who is not in possession of the apparatus and ignores the parameters used for that particular transposition.

A further improvement lies in the extreme fineness of the lineation by which the plane images or patterns are obtained, which permits the reproduction of images and patterns by two or three color printing, so as to eliminate the possibility of their duplication by photomechanical procedures.

These results are obtained by rotating with the same speed and in the same sense both the relief and the plane surface, while the pantograph, with its feeler and its tracer device describes a rectilinear motion. The combination of the rotation and this rectilinear motion results, as hereinafter explained in greater detail, in the relief being reproduced by a continuous spiral line or by concentric circles. The great number of variable but reproducible parameters, which such a system of transposition offers, is apparent: thus, the centers of the relief and plane surface can be made coincident with the center of the spirals or circles, or spaced from them at a selected distance, either within or even outside their area, at any point along the radius of rotation of the latter. Another variable parameter is the ratio between the speed of rotation of the relief and image and the rate of feed of the pantograph. A further, infinitely variable parameter is provided by the pantograph itself, where the transmission ratio between the vertical oscillations of the feeler device and the resultant horizontal excursions of the tracing point can be selected at will.

Further parameters are provided by switching the apparatus from the process of relief transpositions to the process of creating curvilinear patterns on plane surfaces, which may be used either independently as such or in combination with numismatic engravings. According to the invention, the curvilinear patterns are produced by providing means of engaging the feeler end of the numismatic pantograph with mechanisms imparting to said end cyclically repeated oscillations in lieu of the aperiodic oscillations caused by the raised and depressed portions of a relief. Such a mechanism can be for instance a cam drive. The pattern so obtained will be the combination of concentric circles or a spiral with other curves. The form of the cams, their combination and the selected ratio between the speeds of rotation of the cam or cams, and that of the plane surface receiving the pattern, constitute said additional variable parameters, so that any duplication of an image, even on the same apparatus, presupposes as an indispensable condition the exact knowledge of all reproductional parameters.

In the case where the engravings obtained serve for two or more color reproductions of the relief or the patterns, the plate for each additional color is engraved by radially staggering, by an appropriate fraction of the pitch of the spiral or circles, the center of these figures.

For a better understanding, the invention will now be exemplified by the following description of one of its possible embodiments, taken with reference to the attached drawings, wherein:

FIGURE 1 is a top view of the apparatus embodying the invention, in its numismatic engraving position, where, for the sake of clarity, the mechanism for pattern creating is not shown.

FIGURE 2 is a side elevational view of the apparatus, in the position of pattern engraving.

FIGURE 3 is an enlarged view of a device for disengaging the pantograph of the apparatus.

FIGURE 4 is an enlarged representation of a spiral traced upon the plane surface.

FIGURE 5 is a second spiral, traced on a second plate.

FIGURE 6 is the figure obtained by superimposing both spirals.

FIGURE 7 is an enlarged elevational view of a variable cam mechanism.

The apparatus schematized in FIGS. 1 and 2 carries two discs 1 and 2 pivoted in the machine frame 8. Also journaled in the frame 8 is a shaft 3, to which are keyed bevel gears 4 and 6 which mesh with bevel gears 5 and 7 keyed to the respective spindles 9 and 10 of said discs 1 and 2. By this or any other known and suitable arrangement, a (not shown) variable speed motor will rotate both discs synchronously through any suitable gear drive, of which, for better clarity, only gear 11 is shown, which is fixed to shaft 3.

The speed ratio between discs 1 and 2 and lead screw 21 controlling the rectilinear motion of the pantograph can also be selected using any known variable transmission, such as the one here illustrated, in which, between gear 12 fixed to shaft 3 and the variable gear 18 coupled by a not shown clutch means to one end of screw spindle 21 are interposed gears 13 and 17. Stub shaft 14 of wheel 13 is journaled in machine frame 8. To its other end is pivoted a connecting piece 15, which carries one end of the stub shaft 16 of wheel 17. Thus wheel 17 can be swung in and out of mesh with wheel 18. Obviously the description of this particular drive was here determined solely by its extreme simplicity, it being apparent that any other type of transmission, and preferably an infinitely variable drive could be advantageously installed in its stead.

An index plate 19 is fixed on lead screw 21 adjacently to wheel 18.

Lead screw 21 is associated with nut 22 fastened, as by bolts, to a shoe 23 slidably movable on guide plate 24 which is rigidly supported on the frame 8.

Shoe 23 carries a horizontal lug 26 projecting inwardly and rigid with a pointed pivot 27 depending from it. A numismatic pantograph is hinged to pivot 27.

Any suitable known type of numismatic pantograph can be applied with the apparatus on the condition that to each rising and sinking of its feeler end scanning the projections and the depressions of the relief there corresponds a horizontal excursion of its tracer end. The inventive improvement concerning the pantograph per se, lies in the concept of rendering this feeler end such that it becomes also directly engageable with a mechanism imparting to it cyclic sequences of oscillations, whereby the same machine is rendered also capable of tracing the already discussed composite curve pattern.

Therefore it is apparent that the pantograph described in the following, while particularly adapted for the present purpose, does not represent the only possible solution of the object of the invention, but is merely illustrative. It is suspended to pivot 27 by its frame 28, in such a way that the point of pivot 27 engages in a matching cavity located in the exact center of the bottom side of said frame and is kept therein by a pointed screw 29 which passes through a tapped hole located exactly in the center of the top side of said frame. The point of screw 29 enters a cavity atop pivot 27, exactly perpendicularly over the latter's point. This arrangement permits an easy oscillation of frame 28 around an exactly vertical axis determined by the points of pivot 27 and of screw 29.

Two cavities, located at precisely the same level, are provided in the lower ends of the two vertical sides of frame 28, into which cavities penetrate two screws 31, each passing through a tapped hole located in the exact center of the shorter sides of a frame 30, the screws and their associated cavities defining together a horizontal axis around which said frame 30 is oscillatable.

That side of frame 30 which is facing inward carries a guide bar 32 for the tracer point 33, while a counterweight 34 displaceable on an extension of the opposite side of frame 30 serves to adjust the pressure of the tracer point upon the plate or other image-receiving surface fixed to disc 1.

The vertical side 28' of frame 28 facing towards disc 1 is provided with a longitudinal groove, in which an angle piece 35 is slidable, its height being adjustable by turning a screw 37 located atop said extension. The end of the horizontal side of member 35 is bifurcated, as at 36. On a support pin, here schematically indicated at 43, and rigid with pantograph shoe 23 is pivoted another angle member comprising the arms 39 and 40. Arm 39 ends in an upwardly extending bar 38 which is retained between the two prongs of the fork 36. A bar 41 perpendicular to side 40 is slidably movable on the latter. Its free end carries the feeler point 42. A counterweight 44 applied to an extension of arm 40 can be displaced axially and serves to adjust the pressure exerted by the feeler 42 against the relief.

Support 43 permits the angle piece 39–40 to swing only around the longitudinal axis of arm 39. Thus, when the feeler 42 vertically rises and sinks as indicated by arrow $f$, while scanning the projections and depressions of the relief $a$ rotating with disc 1, its motions will cause arm 40 and extension 38 to correspondingly oscillate in two parallel planes perpendicular to the longitudinal axis of arm 39. Since fork 36 can swing in a horizontal plane only, the vertical oscillations of the extension 38 will produce proportional horizontal oscillations of fork 36 and in the frame 28 rigid with it, and will ultimately bring about the horizontal excursions of the tracer point 33. On the plane surface $b$, revolving with disc 2, these excursions will produce as many deviations from the pure spiral path as point 33 is tracing, following the rectilinear progress of the pantograph, with the result of either crowding together or thinning out the adjacent convolutions of the spiral at the point of excursions, thus rendering the relief effect by obtaining darker and respectively lighter areas on the plane surface. This was hitherto effected by parallel strokes in the prior art. The novelty of the present mode of reproduction lies mainly in the spiraliform transposition of the relief, the advantages of which have already been discussed. By the vertical displacement of fork 36 the transmission ratio between feeler 42 and tracer 33 may be varied at will without the need of the displacement of either point upon the pantograph.

As previously stated, both the relief and the plane surface can be positioned either on the center or spaced away from the center of their respective discs 1 and 2. In the latter case the feeler and tracer point contact them respectively only during a part of the rotation of said discs. To accelerate the process of transposition, discs 1 and 2 are conveniently accelerated during the inoperative portion of their rotation.

For this purpose interchangeable cams, such as those indicated at 49 and 50 can be applied, as by pins, to the periphery of one disc. These cams actuate a switch device 51 which increases, through the drive motor, the disc speed during the inoperative portion. To lift the pantograph from the discs during these quicker rotations, a lifting device, such as that illustrated in FIG. 3, can be applied to the apparatus. It consists of a cam 52 keyed to shaft 3, which cam cooperates with roller 55 applied to one arm of a two-armed lever 53 fulcrumed at 54 to the machine frame. The opposite end of said lever is linked to a stirrup 56 which hooks under a bar, schematically indicated at 58, which bar is connected to the feeler and tracing points. By this arrangement, when lever 53 is depressed by the revolving cam 52 into the position schematically indicated by the dotted line in FIG. 3, the feeler and tracer points will be lifted from their respective surfaces.

The apparatus is provided with index marks which permit the precise setting of the parameters selected for the various operations of transposition, and thus also render it possible to reproduce them at a later stage, if needed.

To this end, index marks are provided on the rims of both discs 1 and 2, said index marks being partially shown on the rims of discs 1 and 2 in FIG. 1 to assist in the exact positioning of pieces $a$ and $b$. Over its clutch, the lead screw 21 is disconnected from wheel 18 and rotated until a point 45, fixed on shoe 23, is brought to register with a reference mark 47 fixed on the machine frame. A magnifying glass, placed conveniently correspondingly to the reference mark, permits an increase in the accuracy of the registration. Thereafter the numismatic engraving can be started, after a wheel 18 of selected size has been applied to the drive and connected to the screw 21 through the clutch.

Where the relief has to be transposed for a more-color print, the spirals used are identical for each color plate, but the starting point of each spiral is displaced, with respect to that of the spiral on the first plate, by a fraction of a spiral pitch. To this end, after the transposition on the first plate, the machine is restored, with the aid of the reference marks, to its original starting position, the clutch connection between wheel 18 and shaft 21 is opened and the index wheel 19 rotated by an angle of 90°, 120°, 180° etc., according to whether the displacement is to be by ¼, ⅓ or ½ pitch.

FIGS. 4 and 5 represent spirals engraved on 2 plates for two different colors in which the latter spiral is displaced by half a pitch with respect to the former. The pattern resulting from these two spirals is schematized in FIG. 6.

As initially stated the present apparatus and procedure is not limited to the transposition of reliefs upon plane surfaces, but is also capable of creating patterns. According to the invention, this object is attained by associating the feeler end of the pantograph with a mechanism, which imparts to it cyclically repeated sequences of vertical motions, which are translated by the pantograph into cyclic sequences of horizontal excursions of the tracer point. In other words, the pantograph, in lieu of being influenced by the projections and depressions of a relief, is controlled by a mechanism.

The pattern which results on the plane surface from the cyclic succession of the tracer excursions, the rotation of disc 2 and the rectilinear progress of the pantograph is a combination of a spiral with other curves, whose reproduction is conditioned to the use of the same machine and same parameters used for the original pattern.

The mechanism for attaining the abovementioned object is shown more particularly in FIGURE 2 and consists in a support 60 depending from frame 8. To its lower end is pivoted at 61 a rocking lever 62. The upper part of the right arm of said lever carries a longitudinal groove into which the feeler 42 is placed. A displaceable counter-weight 63 can be fixed in a selected position by the set screw 64.

A tappet rod 65 is slidable in the vertical bore of a bracket 66 fastened to frame 8. Upon its top end rests the left end portion of lever 62, while its lower end presses against the cam follower 68 which is pivoted through arm 67 at pin 67a. The pressure on the cam follower can be varied by conveniently displacing weight 63.

The cam 69 consists in a wheel provided with one or more concentric arrays of holes 75, which, through a variable drive arrangement, which is here schematized by shaft 74 and gears 71, is connected to wheel 70 keyed to the drive shaft. Pins 76, on which are rotatable rolls 77 are inserted into a given number of the holes 75, to form a selected cam pattern. According to this pattern, the sequences and amplitudes of oscillation of lever 62 and thus of the pantograph connected with it can be determined to trace a practically infinite number of different patterns.

The field of application of the present process and apparatus, as well as the possibilities of numismatic reproduction, pattern tracing and their combination is extremely wide, and the reproductions thus obtained can attain any degree of complexity. Any type of raised or hollow figure can be transposed thereby on flat surfaces, such as metal plates for etching, glass plates covered with a thin coating of paint, for contact reproduction. The reliefs used for the transposition are not limited to medals and coins. Any type of relief pattern can be transposed by the inventive apparatus and process into very pleasing and difficultly imitable plane images. Among the possible applications, there is to be particularly mentioned the use of line blocks with their raised lines and depressions. Their relief, even if it is originally simple per se, is transposed into a very complex configuration, from which a non-counterfeitable second line block can be obtained. The patterns created by the cooperation of the pantograph with the cam mechanism of the apparatus can also be combined to form complex ornamental motifs; a line block can be made from this combination, and by subjecting this line block to one or more consecutive transpositions, as many line blocks for one or more-color prints can be obtained. The resultant prints, in addition to presenting a very pleasing appearance, defy any fraudulent imitation.

Obviously, the above apparatus can be modified in many ways, without departing from the scope and idea of the present invention. Particularly to obtain concentric circles in lieu of the spirals here described, a device could be installed which periodically disconnects the drive from shaft 3 to lead screw 21 during a whole revolution of the discs. Alternately, lead screw 21 and nut 22 could be replaced respectively by a rack and pinion. Such arrangements are known and therefore need not be described here.

What I claim is:

1. A method for the transposition of a three dimensional relief configuration onto a plane surface by means of curved lines, said method comprising rotating a relief to be transposed and a plane surface to receive a transposed image, said image and surface being rotated in synchronism at the same speed and in the same sense of rotation, conducting a feeler means along said relief and a tracer means over said image-receiving plane surface with a generally rectilinear motion, and interconnecting the feeler means and tracer means such that for each vertical oscillation of said feeler means on the relief there is produced a corresponding horizontal lateral excursion of the tracer means in said plane surface.

2. A method as claimed in claim 1 wherein the relief to be transposed and the plane surface to receive the transposed image are each rotated around respective centers, the feeler means and the tracer means being respectively conducted over the relief and the plane surface with continuous rectilinear motion to produce a spiraliform scanning of the relief by the feeler means and a spiraliform trace on the plane surface by the tracer means.

3. A method as claimed in claim 1 wherein the relief to be transposed and the plane surface to receive the transposed image are each eccentrically rotated, the feeler means and the tracer means being respectively conducted over the relief and the plane surface with continuous rectilinear motion to produce a spiraliform scanning of the relief by the feeler means and a spiraliform trace on the plane surface by the tracer means.

4. A method as claimed in claim 2 comprising separately simulating a relief onto a plurality of plane surfaces in a corresponding number of colors, the centers of the spiraliform scanning and spiraliform trace of each member of said plurality of plane surfaces being staggered by a fraction of a pitch with respect to the centers of the spiraliform scanning and spiraliform trace of every other member of the plurality of plane surfaces.

5. A method as claimed in claim 3 comprising separately simulating a relief onto a plurality of plane surfaces in a corresponding number of colors, the centers of the spiraliform scanning and spiraliform trace of each member of said plurality of plane surfaces being staggered by a fraction of a pitch with respect to the centers of the spiraliform scanning and spiraliform trace of every other member of the plurality of plane surfaces.

6. Apparatus for copying a simulation of a relief configuration onto a plane surface, said apparatus comprising two rotatable discs, a common drive shaft coupled to said discs to rotate the same synchronously at the same speed and in the same sense of rotation, the first disc being adapted for carrying a relief image to be copied and the second disc being adapted for carrying a plane surface for receiving a simulated copy of the relief image, pantograph means driven from said shaft, with rectilinear motion over said discs, feeler means on said pantograph for scanning the relief image along curved traces, and tracer means on said pantograph for reproducing said relief image upon said plane surface along corresponding curved traces, said pantograph means including means for laterally displacing the tracer means in relation to the vertical excursions of the feeler means whereby the depth of the relief image is simulated on the plane surface by the production of lateral deviations from said curved traces on said plane surface.

7. Apparatus according to claim 6 comprising means for varying the ratio between the vertical excursions of the feeler means scanning the relief and the lateral deviations from the curved traces of the tracer means.

8. Apparatus according to claim 6, wherein the feeler means is lifted and operatively engaged with means adapted for imparting cyclic successions of vertical motions to said feeler means.

9. Apparatus according to claim 6 comprising a shoe coupled to the pantograph means to drive the same, a lead screw coupled to said shoe, and a variable transmission connecting said lead screw and said drive shaft in driving relation.

10. Apparatus according to claim 6 wherein one of said discs has a peripheral surface, switch means located adjacent said peripheral surface for controlling the speed of said drive shaft and thereby the speed of the discs, and cam means on said peripheral surface for acting on said switch means to vary the speed of rotation of the discs during each revolution thereof.

11. Apparatus as claimed in claim 6 comprising means for lifting the feeler and tracer means of the pantograph means from the relief image and the plane surface respectively during periods in which the feeler and tracer means scan portions of the discs which are not covered by the relief image and plane surface respectively.

12. Apparatus as claimed in claim 11, wherein said means for lifting comprises a bar connected to the feeler means and tracer means, a stirrup engaging said bar for lifting the same and the feeler and tracer means therewith, pivotable lever means having two ends, one end of said lever means being connected to the stirrup to move the same, and cam means mounted on said drive shaft for acting on the other of said ends of the lever means to pivotably move the same, said cam means having a profile such that the lever means is pivotably moved and the feeler means and tracer means lifted during periods in which the feeler means and tracer means are positioned above portions of the discs which are not covered by the relief image and plane surface respectively.

13. Apparatus according to claim 11 comprising means for controlling the speed of the discs such that during periods in which the feeler means and tracer means scan portions of the discs not covered by the relief image and plane surface respectively, the speed of rotation of the discs is increased.

References Cited
UNITED STATES PATENTS 3,213,538   10/1965   Trenka _____ 33—23

LEONARD FORMAN, *Primary Examiner.*

H. N. HAROIAN, *Examiner.*